United States Patent
Chen et al.

(10) Patent No.: US 10,415,712 B2
(45) Date of Patent: *Sep. 17, 2019

(54) AIR ADMITTANCE VALVE PREVENTING MEPHITIS OVERFLOW

(71) Applicant: River Rock inc., Santa Fe Springs, CA (US)

(72) Inventors: Chao Chi Chen, Changhua (TW); Michael Chiang, Rowland Heights, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/786,814

(22) Filed: Oct. 18, 2017

(65) Prior Publication Data
US 2018/0038496 A1    Feb. 8, 2018

Related U.S. Application Data

(63) Continuation of application No. 14/813,422, filed on Jul. 30, 2015, now Pat. No. 9,863,546.

(30) Foreign Application Priority Data

Jan. 13, 2015 (TW) ............................. 104200490 A

(51) Int. Cl.
*F16K 15/03* (2006.01)
*F16K 24/06* (2006.01)

(52) U.S. Cl.
CPC ............ *F16K 15/033* (2013.01); *F16K 24/06* (2013.01); *Y10T 137/7897* (2015.04); *Y10T 137/7903* (2015.04)

(58) Field of Classification Search
CPC ........ F16K 24/02; F16K 24/06; F16K 15/033; Y10T 137/7897; Y10T 137/7903
See application file for complete search history.

(56) References Cited

U.S. PATENT DOCUMENTS

| | | | | |
|---|---|---|---|---|
| 1,000,719 A | * | 8/1911 | Cram | B01D 35/153 137/527 |
| 1,354,879 A | * | 10/1920 | Boland | F16K 15/03 137/389 |
| 2,212,302 A | * | 8/1940 | Morgan | F16K 17/10 137/596.2 |
| 2,800,139 A | * | 7/1957 | Langdon | E03C 1/295 137/216.2 |
| 3,815,629 A | * | 6/1974 | Oberholtzer | F16K 15/03 137/527.8 |

(Continued)

*Primary Examiner* — Eric Keasel
*Assistant Examiner* — Kevin R Barss
(74) *Attorney, Agent, or Firm* — The Law Office of Austin Bonderer, PC; Austin Bonderer

(57) ABSTRACT

An air admittance valve preventing mephitis overflow, having a main body with an air entry guide base defining an air entry guide; a pivot support; and a valve seat. A sealing valve group having a sealing valve body that defines a recess; a flexible member; a pivot housing; and a pivot. The valve seat is located about the air entry guide. The pivot is located in the pivot housing and the pivot support, and the pivot is located along, or adjacent to, the center of gravity of the sealing valve body. The flexible member is at least partially located in the recess and abuts the main body; and when the air admittance valve is closed, the sealing valve body abuts the valve seat.

14 Claims, 6 Drawing Sheets

(56) References Cited

U.S. PATENT DOCUMENTS

| | | | | |
|---|---|---|---|---|
| 3,941,151 A * | 3/1976 | Biddle | ............... | E03F 5/08 |
| | | | | 137/527.6 |
| 4,039,004 A * | 8/1977 | Luthy | ............... | F16K 15/03 |
| | | | | 137/527 |
| 4,304,392 A * | 12/1981 | Maciulaitis | ............... | F16K 1/2285 |
| | | | | 251/173 |
| 4,556,084 A * | 12/1985 | Frawley | ............... | E03C 1/122 |
| | | | | 137/526 |
| 4,567,802 A * | 2/1986 | Witherspoon | ............... | B26D 1/30 |
| | | | | 83/581 |
| 4,977,926 A * | 12/1990 | Hocking | ............... | A47B 96/068 |
| | | | | 137/512.1 |
| 5,641,012 A * | 6/1997 | Silversides | ............... | A01C 15/006 |
| | | | | 137/846 |
| 5,707,040 A * | 1/1998 | Gasaway | ............... | F16K 1/2261 |
| | | | | 251/305 |
| 7,886,765 B2 * | 2/2011 | Chalich | ............... | F16K 15/03 |
| | | | | 137/217 |
| 8,459,298 B1 * | 6/2013 | Valdez | ............... | F16K 15/03 |
| | | | | 137/315.16 |
| 9,863,546 B2 * | 1/2018 | Chen | ............... | F16K 24/06 |
| 2012/0261006 A1 * | 10/2012 | Cashen | ............... | F16K 15/148 |
| | | | | 137/488 |
| 2013/0042931 A1 * | 2/2013 | Vasquez | ............... | F16K 24/04 |
| | | | | 137/505 |
| 2014/0373943 A1 * | 12/2014 | Huber | ............... | E03F 5/0407 |
| | | | | 137/362 |

* cited by examiner

AIR ADMITTANCE VALVE PREVENTING MEPHITIS OVERFLOW

CROSS-REFERENCE TO RELATED APPLICATIONS

This application claims all benefits accruing under 35 U.S.C. § 119 from Taiwanese Patent Application No. 104200490, filed on Jan. 13, 2015, in the Taiwanese Intellectual Property Office, disclosure of which is incorporated herein by reference.

BACKGROUND OF THE INVENTION

Field of the Invention

The present invention relates to an air admittance valve preventing mephitis (noxious gas) overflow, and particularly relates to the field of using an air intake apparatus.

Description of Related Art

According to the prior art air intake pipe structure shown in FIG. 5, which is formed of a pipe body 50, air intake channeling functions are performed for all kinds of apparatuses via connection of apparatuses with the pipe body 50. Also in FIG. 6, a structure formed of a pipe body 50 and a pipe cover body 60 is shown, wherein a net surface 61 is located on top of said pipe cover body 60. The pipe cover body 60 covers the top of the pipe body 50, so that air is introduced into the pipe body 50 through the net surface 61 of the pipe cover body 60. Moreover, although the apparatus coupled through the pipe body 50 performs air intake channeling functions for all kinds of apparatuses.

DETAILED DESCRIPTION

Figure 1:
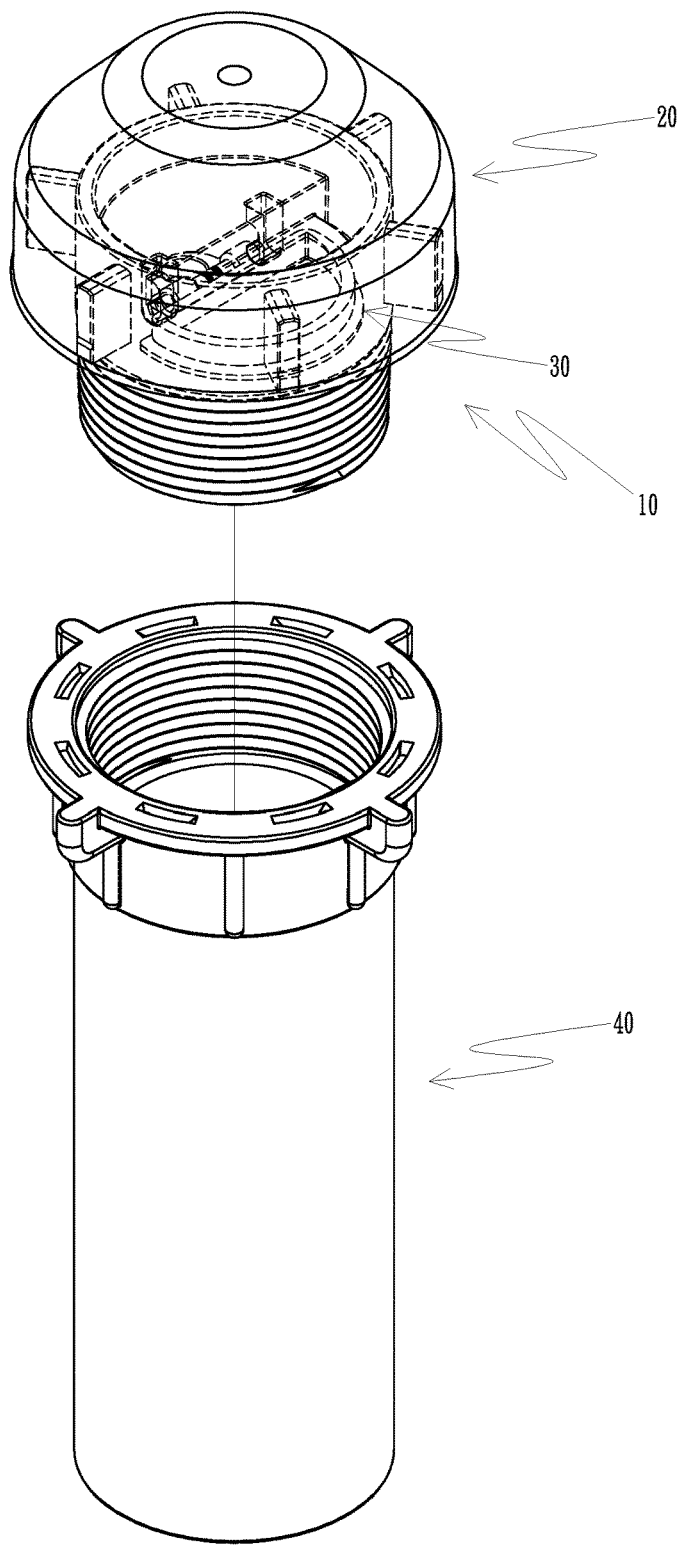
FIG. 1 shows an embodiment of air admittance valve.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The term "vehicle" includes motor vehicles (e.g. motorcycles, cars, trucks, buses), railed vehicles (e.g. trains, trams), watercraft (e.g. ships, boats), aircraft and spacecraft.

The present invention is related to the prior art problems of insufficient prevention functionality and sealing instability in air intake pipe structures, and therefore provides an air admittance valve preventing mephitis overflow. One embodiment provides an air admittance valve preventing mephitis overflow comprising of a main body 10, an external lid body 20, a sealing valve group 30, and a connecting pipe body 40. Plurality of position-fixing lugs 100 can extend from outside the main body 10, and an outer connecting part located outside the main body's 10 lower side. In some embodiments, an outer connecting part is an external thread. An entry guide base 102 is located inside the main body 10. An air entry guide 102A is defined by the entry guide base 102 and a blocking protrusion 102B is located at the other side of the entry guide base 102. One or more pivot supports 102C can be located between the blocking protrusion 102B and the air entry guide 102A. In some embodiments, there are two pivot supports 102C. The external lid body 20 inner side comprises a side groove 21, and the sealing valve group 30 comprises a sealing valve body 31, a valve seat 32, and a flexible member 33. A cover body piece 310 is located on a first side of the sealing valve body 31, and a pivot flange and a recess 312 are located on a second side of the sealing valve body 31. A pivot 311A is located in the pivot housing 311 and the two pivot supports 102C. The friction between the pivot 311A, the pivot housing 311 and/or pivots supports 102 can help define the sensitivity of the air admittance valve. The less the friction, the less force required to overcome the friction and more precise the actuation of the valve can be based upon the other elements (e.g. the flexible member 33). A valve seat 32 is located in the main body recess 312. A flexible member 33 is located in the containing recess. A connecting head 41 is located on the upper side of the connecting pipe body 40. An inner connecting part 410 is located inside of the connecting head 41. In some embodiments, the inner connecting part 410 is a locking thread that will correspond with the outer connecting part 101. A pipe body piece 42 can be located at the lower part of the connecting pipe body 40. The external lid body 20 covers part of the main body 10. In some embodiments, a plurality of the side grooves 21, located inside the external lid body 20, abut the plurality of position-fixing lugs 100 located around the outside of the main body. One or more pivot housings 311 are located on the sealing valve body 31. In some embodiments, the two pivot supports 102C are located on the entry guide base 102. The valve seat 32, located in the main body recess, helps create a seal when abutting the cover body piece 310. In one embodiment, one end of the flexible member 33 is located inside the recess 312 of the sealing valve body 31, and a second end is restricted by the blocking protrusion 102B. An outer connecting part 101 is coupled to an inner connecting part 410. When a sufficient minimum pressure drop is transmitted by the pipe body piece, the cover body piece 310 is actuated, so that fresh air is introduced into the air entry guide 102A through the gap formed between the main body 10 and the external lid body 20. In some embodiments, the sufficient minimum pressure drop is about 0.009 psi (Pounds per Square Inch). In other embodiments, the sufficient minimum pressure drop can be higher (e.g. 0.01 psi up to 3 psi and higher). Air is then introduced into the pipe body piece 42 and the apparatus that is coupled to the pipe body piece 402. When the pipe body piece 402 and the ambient pressure are in balance, or below the minimum pressure drop, the cover body piece 310 abuts the valve seat 32. The flexible member 33, located in the recess 312, biases the cover body piece 310 against the valve seat 32, but allows for opening when the minimal pressure drop is present. Thus overflow of mephitis is prevented by effective sealing and the advantages of good prevention functionality and good sealing stability are obtained.

Figure 2:
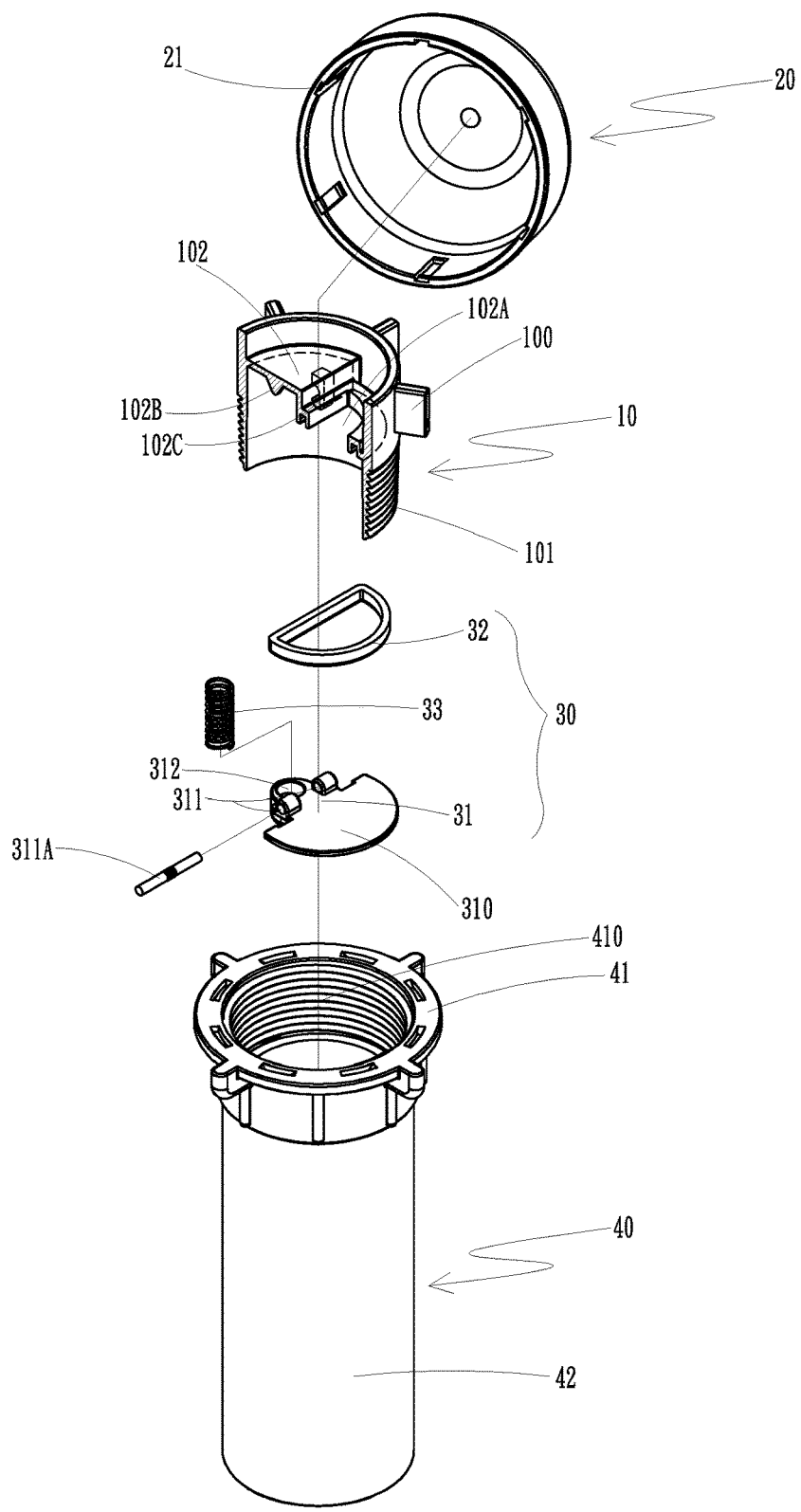
FIG. 2 shows a cross-section, along with other parts, of an embodiment of the main body in an embodiment of the air admittance valve.

FIGS. 1 and 2 show exploded views of an embodiment of an air admittance valve.

A main body 10, in which plurality of position-fixing lugs 100 are located circumferentially outside of the main body 10, and an outer connecting part 101 is located circumferentially around the outside the main body 10. In some embodiments, the outer connecting part 101 is an external locking thread. An air entry guide 102A is located at one side of the entry guide base 102, and a blocking protrusion 102B is located at the other side of the entry guide base 102. The two pivot supports 102C are located opposite to each other between the blocking protrusion 102B and the air entry guide 102A.

In some embodiments, the external lid body 20 comprises plurality of side grooves 21 that are located inside the external lid body 20. The external lid body 20 is located the main body 10, and the plurality of position-fixing lugs 100 are arranged at least partially in the side groove 21. In other embodiments, the position-fixing lugs 100 extend from the main body 10. In some embodies, there are no position fixing lugs 100, only a passage way to allow air to enter the air entry guide 102 is required. In some embodiments, there is no external lid body 20.

In some embodiments, a sealing valve group 30 comprises a sealing valve body 31, a valve seat 32, and a flexible member 33. A cover body piece 310 is located at the first side of the sealing valve body 31 and a recess 312 is defined by the second side of the sealing valve body 31. A pivot 311A passes through the pivot housing 311, which is located between the cover body piece 310 and the recess 312. The valve seat 32 is located in the main body recess. The flexible member 33 is at least partially located within the recess 312, and the pivot housing 311 is located on the sealing valve body 31. Two pivot supports 102C can be located on the entry guide base 102. The valve seat 32 abuts the cover body piece 310, when in the closed position. In some embodiments, the valve seat 32 is partially located in a main body recess. In other embodiments, the valve seat 32 is not in a recess and secured to the main body 10. The flexible member 33 is located in the recess 312 and, in some embodiments, abuts the blocking protrusion 102B. In some embodiments the blocking protrusion 102B is substantially conical shaped. When present, the blocking protrusion can be of any shape that allows it to help keep the flexible member 33 in line with the recess 312.

A connecting pipe body 40 comprises a connecting head 41 and a pipe body piece 42. In some embodiments, an inner connecting part 410 is located inside the pipe wall of the connecting head 41, and/or the inner connecting part 410 is an internal locking thread.

Figure 3:
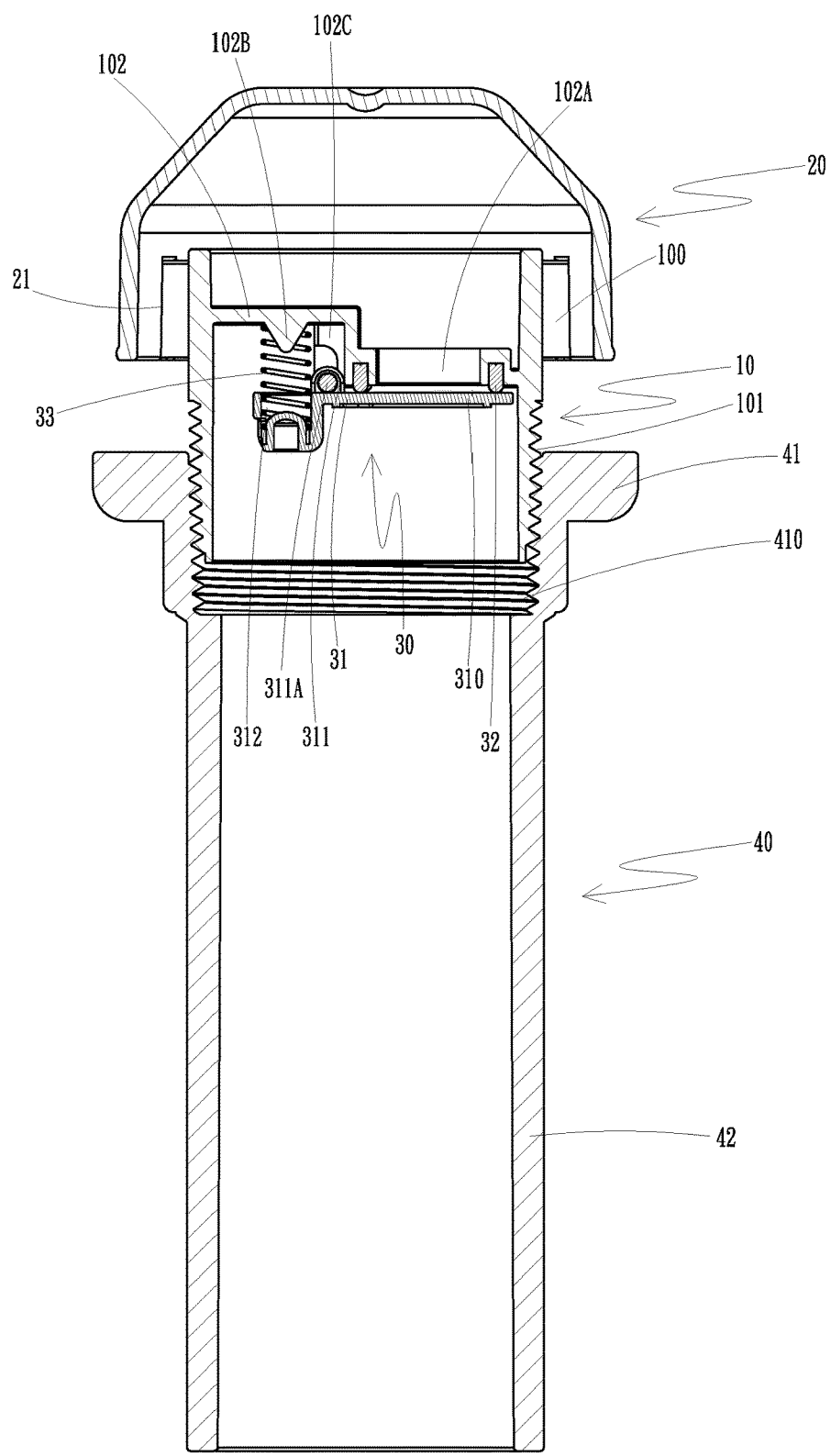
FIG. 3 shows a cross-section of an embodiment of an air admittance valve.
Figure 4:
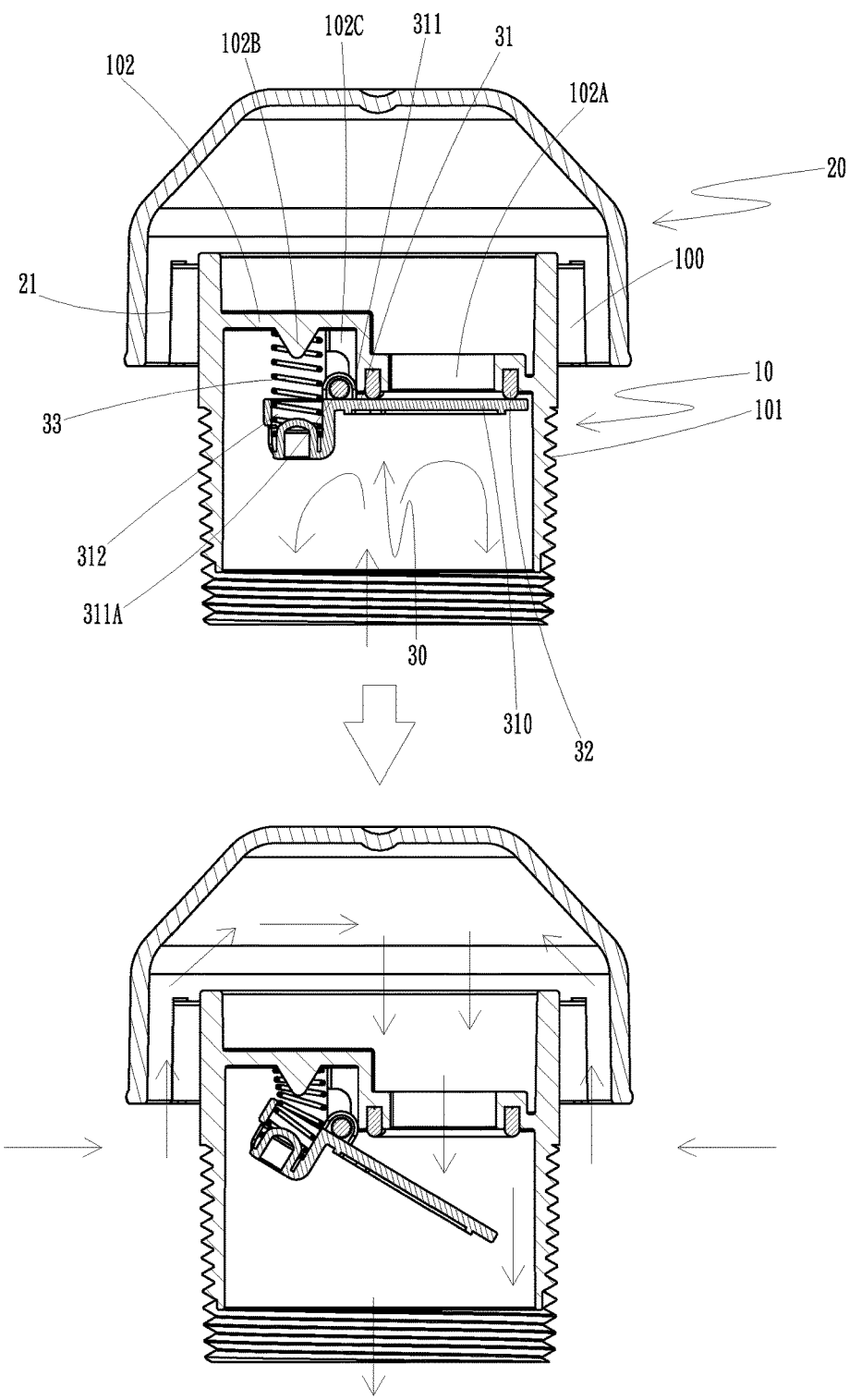
FIG. 4 shows actuation of an embodiment of a valve body in an embodiment of an air admittance valve.
Figure 5:
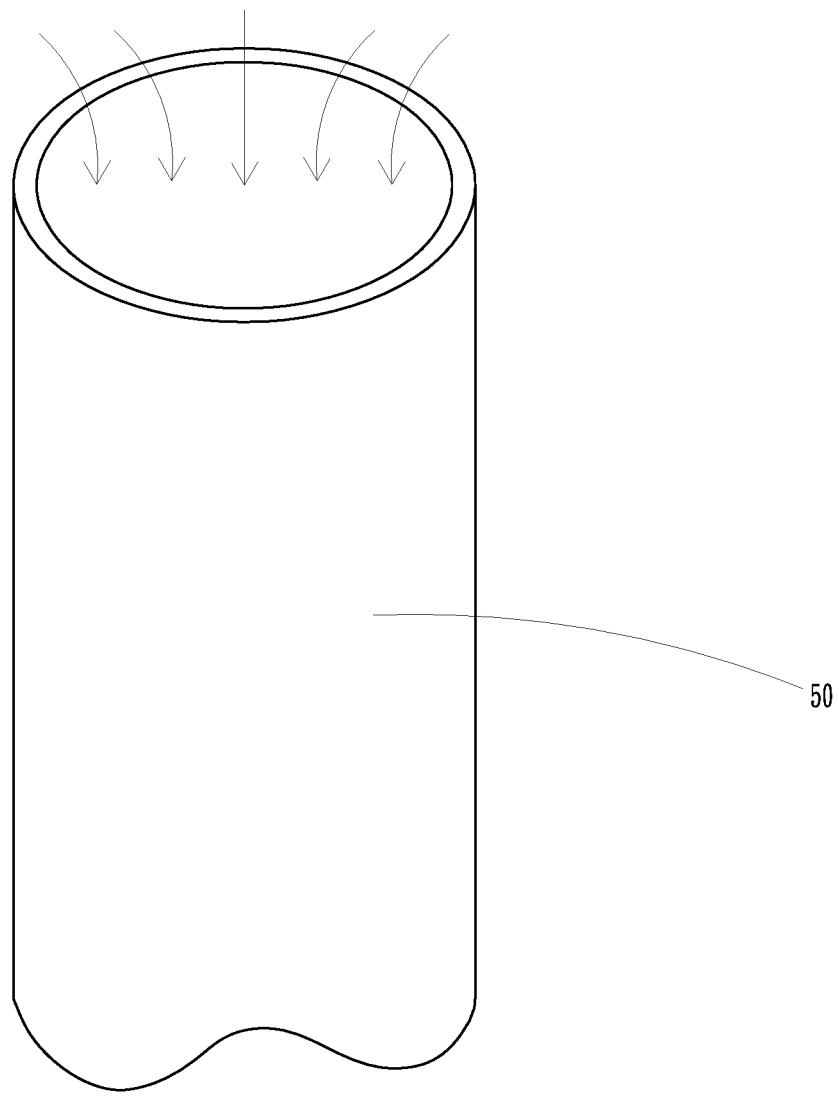
FIG. 5 shows an air intake pipe according to the prior art.
Figure 6:
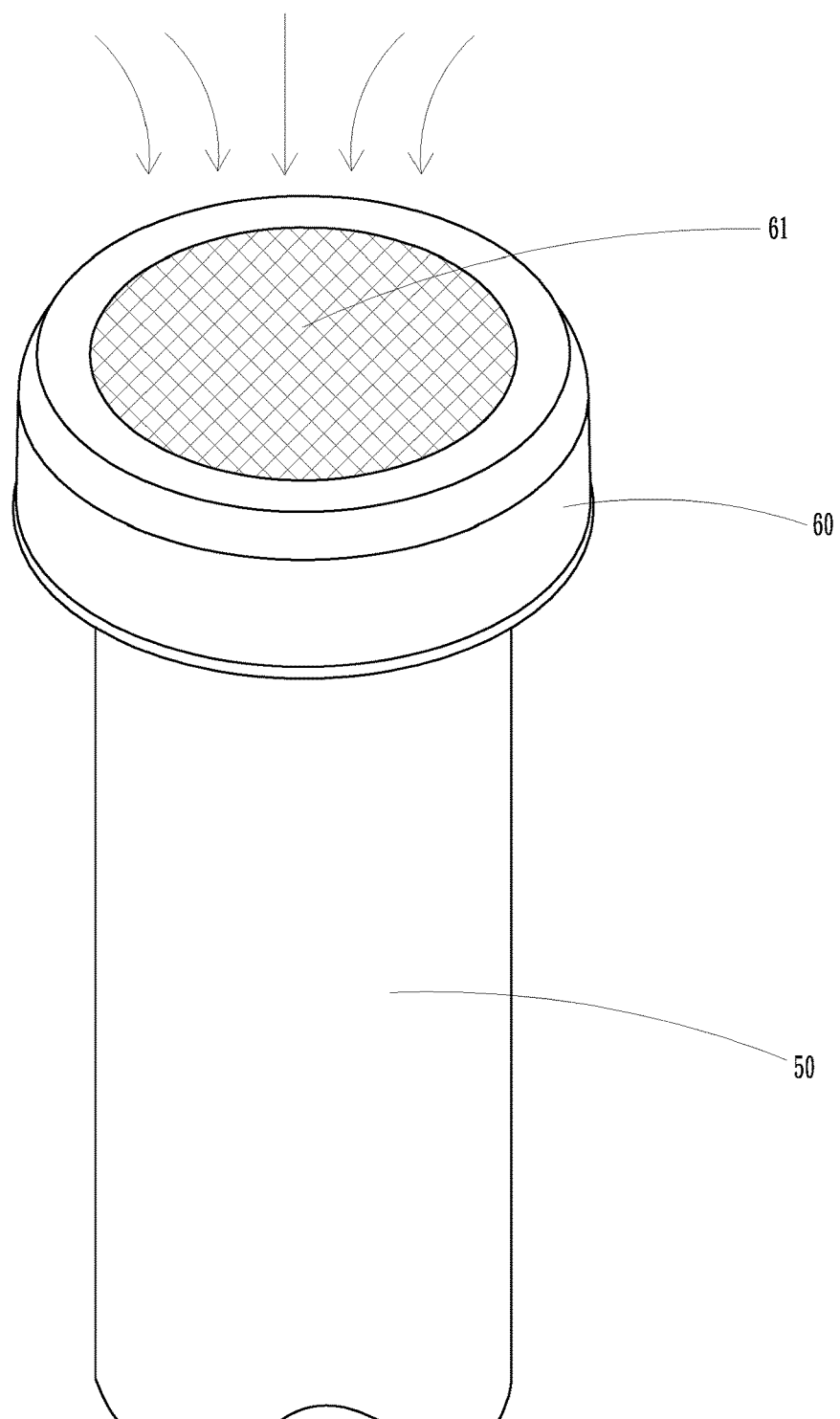
FIG. 6 shows an air intake pipe and pipe cover according to the prior art.

FIGS. 3 to 4 show an assembled embodiment of an air admittance valve. The external lid body 20 is coupled to the main body 10. The side groove 21 is defined by the inside of the external lid body 20 and receives one of the plurality of position-fixing lugs 100 located around the outside of the main body 10. A pivot housing 311 is located on the sealing valve body 31. Two pivot supports 102C are located on the entry guide base 102. When closed, the valve seat 32 abuts the cover body piece 310. A first end of the flexible member 33 is located in the containing recess 312 of the sealing valve body 31, and in some embodiments, the other end is restricted by the blocking protrusion 102B. In other embodiments, the flexible member second end abuts the entry guide base 102. The main body 10 is coupled to the connecting pipe body 40. In some embodiments, an outer connecting part 101 will be coupled to an inner connecting part 410, located inside the connecting head 41. When a sufficient pressure drop occurs in the pipe body piece 42, cover body piece 310 will rotate into an open state, so that air is introduced into the air entry guide 102A from the gap formed between the main body 10 and the external lid body 20. As can be seen in FIG. 4, when in the open state, the entire sealing valve body 31 is located downstream of the valve seat 32. Air will then flow into the pipe body piece 42 and into the apparatus that is coupled with the pipe body piece 42. The flexible member 33 biases the cover body piece 310 to abut the valve seat 32 and close the air entry guide 102A. Thus overflow of mephitis is prevented by effective sealing and the advantages of good prevention functionality and good sealing stability are obtained.

The rotational nature of the sealing valve group 30 provides for balancing when used in situations where there is movement of the apparatus. In some embodiments, this balancing is critical to the proper functioning of the sealing valve group 30. This movement can occur with vehicles. In some embodiments, the pivot 311A is located substantially along the center of gravity of the sealing valve body 31, such that the sealing valve body 31 is balanced about the pivot. This is very useful in an area in which the apparatus would move. For example, while located in a vehicle, such as a recreational vehicle, a bump is hit, and the apparatus is thrusted upwards and back down. During such a movement, the momentum on both sides of the sealing valve body 31 will help prevent accidental opening thus preventing mephitis overflow. The momentum will be balanced on both sides. This balancing of the sealing valve body 31 will also help lessen the amount, if any, openings in response to asymmetrical movements of the apparatus. Also since there is little opening and closing, there will be less rattling when compared to other air admittance valves of the prior art. In some embodiments, the vehicles require the valve body 31 to open at very low pressure drops due to the design of the plumbing systems. In some embodiments the pressure drop required to open the valve body 31 is 0.008 psi. In some embodiments it can be even lower.

The balancing of the sealing valve body 31 will also allow for the flexible member 33 to more precisely determine the opening pressure required for the sealing valve body 31 to actuate. Increasing the strength of the flexible member, will increase the pressure drop required to actuate the sealing valve body, and vice versa. Thus one would be able to easily adjust the pressure drop required by adjusting the flexible member 33 that is used.

One problem that often can occur is that the adhesion between the valve and the valve seat, and when talking about low pressure conditions, the adhesion can cause difficulty in opening the valve. Thus the materials of sealing valve body and the valve seat 32 should be of such a combination as to minimize the adhesion between them. In some embodiments, the valve seat 32 is made of silicone with a low durometer. Other materials that provide for a quality seal can also be used.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An apparatus comprising an air admittance valve, the air admittance valve comprising: a main body comprising an air entry guide base defining an air entry guide, a pivot support, and a valve seat; a sealing valve group comprising: a sealing valve body, that defines a recess; a pivot housing; and a pivot; wherein the valve seat is located about the air entry guide; the pivot is located in the pivot housing and the pivot support, and the pivot passes through, or is adjacent to, a center of gravity of the sealing valve body; and when the air admittance valve is open, the sealing valve body is a single body having a rigid shape as it pivots and resides entirely downstream of the valve seat.

2. The apparatus of claim 1, further comprising an external lid body; wherein the external lid body is coupled to the main body.

3. The apparatus of claim 1, further comprising a connecting pipe body, and the connecting pipe body comprises a connecting head; wherein the connecting head is coupled to the main body.

4. The apparatus of claim 3, wherein the connecting head comprises a connecting head thread, and the main body comprises a main body thread; and the connecting head thread is engaged with the main body thread.

5. The apparatus of claim 1, wherein the main body comprises a plurality of lugs, an external lid body defines a plurality of slide grooves, and the plurality of lugs are received within the plurality of slide grooves.

6. The apparatus of claim 1, wherein the main body defines a main body recess, and the valve seat is located in the main body recess.

7. The apparatus of claim 1, wherein the air admittance valve will open in response to a pressure, and the pressure is in a range of 0.008 pounds per square inch (psi) to 3psi.

8. The apparatus of claim 1, wherein when the air admittance valve is opened, air will flow into an external lid body and through the air entry guide.

9. A vehicle comprising: an air admittance valve comprising: a main body comprising an air entry guide base defining an air entry guide, a pivot support, and a valve seat; a sealing valve group comprising; a sealing valve body, that defines a recess; a pivot housing; and a pivot; wherein the valve seat is located about the air entry guide; the pivot is located in the pivot housing and the pivot support, and the pivot passes through, or is adjacent to, a center of gravity of the sealing valve body; and when the air admittance valve is open, the sealing valve body is a single body having a rigid shape as it pivots and resides entirely downstream from the air entry guide.

10. The vehicle of claim 9, further comprising an external lid body; wherein the external lid body is coupled to the main body.

11. The vehicle of claim 9, further comprising a connecting pipe body, and the connecting pipe body comprises a connecting head; wherein the connecting head is coupled to the main body.

12. The vehicle of claim 11, wherein the connecting head comprises a connecting head thread, and the main body comprises a main body thread; and the connecting head thread is engaged with the main body thread.

13. The vehicle of claim 9, wherein the air admittance valve will open in response to a pressure, and the pressure is in a range of 0.008 PSI to 3 PSI.

14. An apparatus comprising an air admittance valve, the air admittance valve comprising: a main body comprising an air entry guide base defining an air entry guide, a pivot support, and a valve seat; a sealing valve group comprising a sealing valve body, that defines a recess; a pivot housing; and a pivot; wherein the valve seat is located about the air entry guide; the pivot is located in the pivot housing and the pivot support; an axis of rotation of the sealing valve body passes through, or is adjacent to, a center of gravity of the sealing valve body; and when the air admittance valve is open, the sealing valve body is a single body having a rigid shape as it pivots and is located entirely downstream of the valve seat.

* * * * *